(12) United States Patent
Nakazawa et al.

(10) Patent No.: US 6,897,386 B2
(45) Date of Patent: May 24, 2005

(54) ROTATIONAL SLIDING SWITCH

(75) Inventors: Takashi Nakazawa, Tokyo (JP);
Takeshi Okuhara, Tokyo (JP)

(73) Assignee: Niles Co., Ltd., Tokyo (JP)

( * ) Notice: Subject to any disclaimer, the term of this patent is extended or adjusted under 35 U.S.C. 154(b) by 0 days.

(21) Appl. No.: 10/669,402

(22) Filed: Sep. 24, 2003

(65) Prior Publication Data
US 2004/0074743 A1 Apr. 22, 2004

(30) Foreign Application Priority Data

Sep. 27, 2002 (JP) ......................................... 2002-282530

(51) Int. Cl.⁷ .............................................. H01H 9/06
(52) U.S. Cl. .................................. 200/61.88; 200/11 R
(58) Field of Search ............................ 200/11 R–11 H, 200/61.85, 61.88, 61.91, 14, 570, 571

(56) References Cited

U.S. PATENT DOCUMENTS

| | | | | |
|---|---|---|---|---|
| 3,862,383 A | * | 1/1975 | Bednarek et al. ......... 200/11 R |
| 5,577,605 A | * | 11/1996 | Dilly et al. ................... 200/564 |
| 5,811,747 A | * | 9/1998 | Taniguchi et al. ......... 200/61.88 |
| 6,096,988 A | * | 8/2000 | Tsukamoto et al. ....... 200/61.88 |
| 6,154,107 A | * | 11/2000 | Tomotoshi ................... 335/205 |

* cited by examiner

Primary Examiner—Michael A. Friedhofer
(74) Attorney, Agent, or Firm—Jordan and Hamburg LLP

(57) ABSTRACT

Increase in size can be controlled, manufacturing cost can be reduced, and accurate detection is possible even when the number of fixed contacts is increased. An inhibitor switch comprising a pole base on the fixed side supporting fixed contacts and movable bases that support movable contacts 31a and can move rotationally so as to cause movable contacts to slide under the prescribed contact pressure against fixed contacts the rotation position of manual shaft 5 side being detected by the sliding position of sliding contacts with respect to fixed contacts wherein fixed contacts are provided on each of the two side surfaces of pole base, and movable bases are arranged singly on each of the two side surfaces of pole base.

2 Claims, 10 Drawing Sheets

FIG. 5
(a)
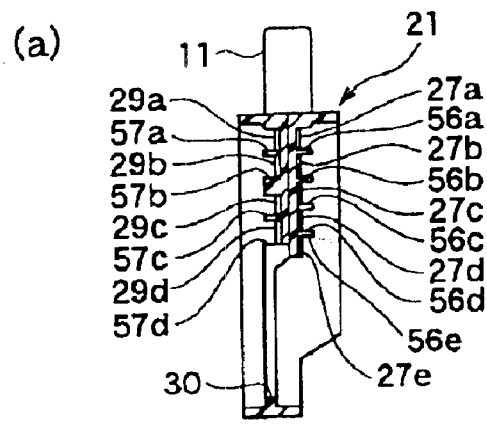
(b)
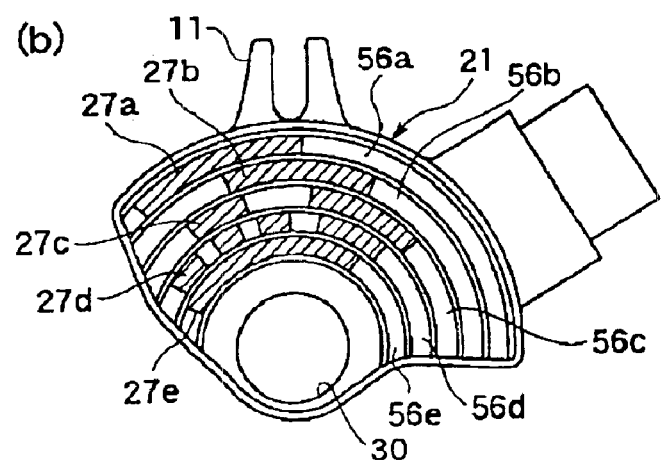
(c)
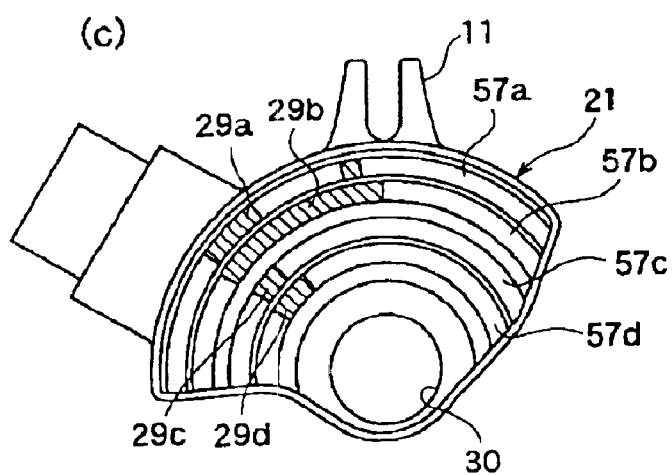

FIG. 11
(a)
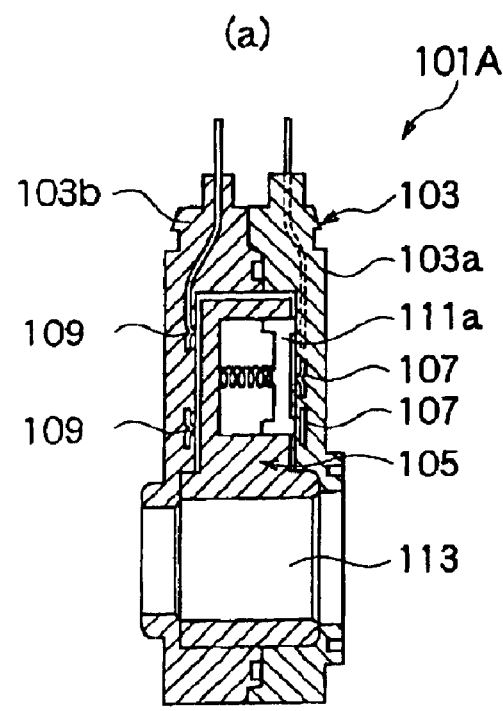
(b)
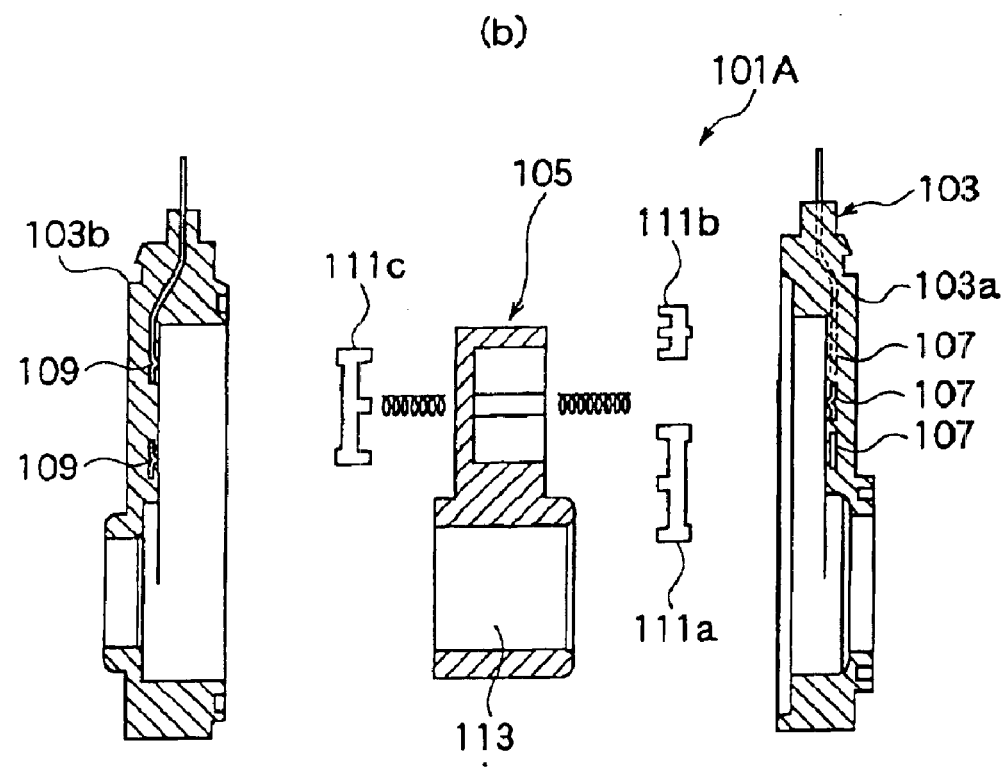

ROTATIONAL SLIDING SWITCH

BACKGROUND OF THE INVENTION

1. Field of the Invention

The present invention relates to a rotational sliding switch employed, for example, for an inhibitor switch for detecting a shift position in an automatic transmission.

2. Description of the Related Art

An inhibitor switch such as shown in FIGS. 10 and 11 is a conventional rotational sliding switch. FIG. 10 is an exploded perspective view of the conventional inhibitor switch and FIG. 11 shows another conventional inhibitor switch, wherein (a) is a cross-sectional view thereof and (b) is a cross sectional view of the disassembled inhibitor switch.

In an inhibitor switch 101 shown in FIG. 10, a contact plate 117 is fixedly supported in a housing 115, and a plurality of fixed contacts 119 are provided at the contact plate 117. Further, movable contacts 123, 124 are mounted on a movable base 121. A joining hole 125 for joining to a manual shaft of an automatic transmission is provided in the movable base 121.

The housing 115 is mounted on a mission case side of the automatic transmission, and joining hole 125 of the movable base 121 is joined to the manual shaft side.

Therefore, if the manual shaft is rotated, the movable base 121 moves rotationally, the movable contacts 123, 124 are caused to slide under the prescribed contact pressure against the fixed contacts 119 and the rotation position of the manual shaft can be detected and the shift position of the automatic transmission can be detected by the sliding position of the movable contacts 123, 124 with respect to the fixed contacts 119 (for example, see Japanese Patent Application Laid-open No. H8-293228, page 4, FIG. 3).

An inhibitor switch 101A shown in FIG. 11 comprises a pole base 103 and a movable base 105. The pole base 103 is composed of a pair of sections 103a, 103b, and the sections 103a, 103b together constitute the pole base 103. A plurality of fixed contacts 107 are provided at section 103a, and a plurality of fixed constants 109 are provided at the other section 103b.

Contact bodies 111a, 111b and a contact body 111c comprising respective movable contacts on both side surfaces thereof are provided at the movable base 105. A joining hole 113 for joining to the manual shaft of the automatic transmission is provided in the movable base 105.

Further, the above-mentioned sections 103a, 103b are mated with one another so as to sandwich the movable base 105, and the sections 103a, 103b are joined to each other, for example, by ultrasonic welding. Furthermore, the pole base 103 is fixedly supported on the mission case side of the automatic transmission, and a joining hole 113 of the movable base 105 is joined to the manual shaft.

Therefore, as the manual shaft rotates, the movable base 105 moves rotationally, the movable contacts of the contact bodies 111a, 111b and the contact body 111c slide under the prescribed contact pressure against the fixed contacts 107 109 and the rotation position of manual shaft can be detected and the shift position of the automatic transmission can be detected by the sliding position of the movable contacts against the fixed contacts 107 109 (for example, see Japanese Patent No. 2705730, pages 3, 4, FIGS. 1, 4).

The problem associated with the structure described in Japanese Patent Application Laid-open No. H8-293228 is that because a plurality of the fixed contacts 119 are supported on one side surface of the contact plate 117, when the number of the fixed contacts 119 is increased as required, the contact plate 117 unavoidably increases in size accordingly and the structure is enlarged.

By contrast, in the structure described in Japanese Patent No. 2705730, the pole base 103 is composed of a pair of sections 103a, 103b, and the fixed contacts 107 109 are provided on respective sections. As a result, the increase in size of the entire structure can be controlled even when the number of the fixed contacts 107 109 is increased as required.

However, the problem is that because the pole base 103 is composed of a pair of the sections 103a, 103b and those sections are joined to each other, for example, by ultrasonic welding, a manufacturing error such as inaccurate mutual alignment of the fixed contacts 107 109 can easily occur. Furthermore, the fixed contacts 107 109 have to be insert molded individually on each of the pair of sections 103a, 103b, this process being cost inefficient.

It is an object of the present invention to provide a rotational sliding switch which can be manufactured with high accuracy and at a low cost and in which the increase in size can be controlled even when the number of fixed contact points is increased.

SUMMARY OF THE INVENTION

A first aspect of the present invention provides a rotational sliding switch comprising: a pole base of a fixed side supporting fixed contacts and movable bases that support movable contacts and can move rotationally so as to cause the movable contacts to slide under the prescribed contact pressure against said fixed contacts, the rotation position of the side to be detected being detected by the sliding position of the sliding contacts with respect to the fixed contacts, wherein the fixed contacts are provided on each of the two side surfaces of the pole base, and the movable bases are arranged singly on each of the two side surfaces of the pole base.

A second aspect of the present invention provides a rotational sliding switch according to the first aspect, wherein one of the movable bases is joined to a manual shaft of an automatic transmission, and the other movable base is mated with a plate rotating together with the manual shaft.

A third aspect of the present invention provides a rotational sliding switch according to the second aspect, wherein the plate is a detent plate for determining each rotation position of the manual shaft with respect to the fixed side.

With the first aspect of the present invention, the rotational sliding switch comprises a pole base of a fixed side supporting fixed contacts and movable bases that support movable contacts and can move rotationally so as to cause the movable contacts to slide under the prescribed contact pressure against said fixed contacts, and the rotation position of the side which is to be detected can be detected by the sliding position of the sliding contacts with respect to the fixed contacts. Moreover, the fixed contacts are provided on each of the two side surfaces of the pole base, and the movable bases are arranged singly on each of the two side surfaces of the pole base. Therefore, the increase in size can be controlled even if the number of fixed contacts is increased. Furthermore, because the fixed contacts are not split into two groups, the positional accuracy of the fixed contacts with respect to each other can be easily retained and a high accuracy can be maintained. Because all the fixed contacts are provided on a single pole base, the production cost is lower than in the case when the fixed contacts are insert molded on a pole base split in two.

With second aspect of the present invention, in addition to the effect of the first aspect, because one of the movable bases is joined to a manual shaft of an automatic transmission, and the other movable base is joined to a plate rotating together with the manual shaft, it is possible to drive and rotate separately one movable base with the manual shaft and the other with the plate rotating together with the manual shaft, thereby making it possible to decrease the number of places where backlash occurs, to cause rotational movement with a better accuracy, to detect accurately the rotation position of the manual shaft by the sliding position of the movable contacts with respect to the fixed contacts, and to detect the shift position of the automatic transmission more accurately than in the case in which one movable base is driven via the other movable base.

With the third aspect of the present invention, in addition to the effect of the first aspect, because the plate is a detent plate for determining each rotation position of the manual shaft with respect to the fixed side, no special separate plate has to be provided, the increase in the number of parts can be controlled, and the assembling and management of parts can be facilitated.

BRIEF DESCRIPTION OF THE DRAWINGS

FIG. 5 illustrates the pole base of the embodiment, (a)—a cross-sectional view; (b)—a plan view; (c)—a rear view;

FIG. 11 relates to another conventional example, (a)—a cross-sectional view, (b)—an exploded cross sectional view.

DESCRIPTION OF THE PREFERRED EMBODIMENTS

Figure 1:
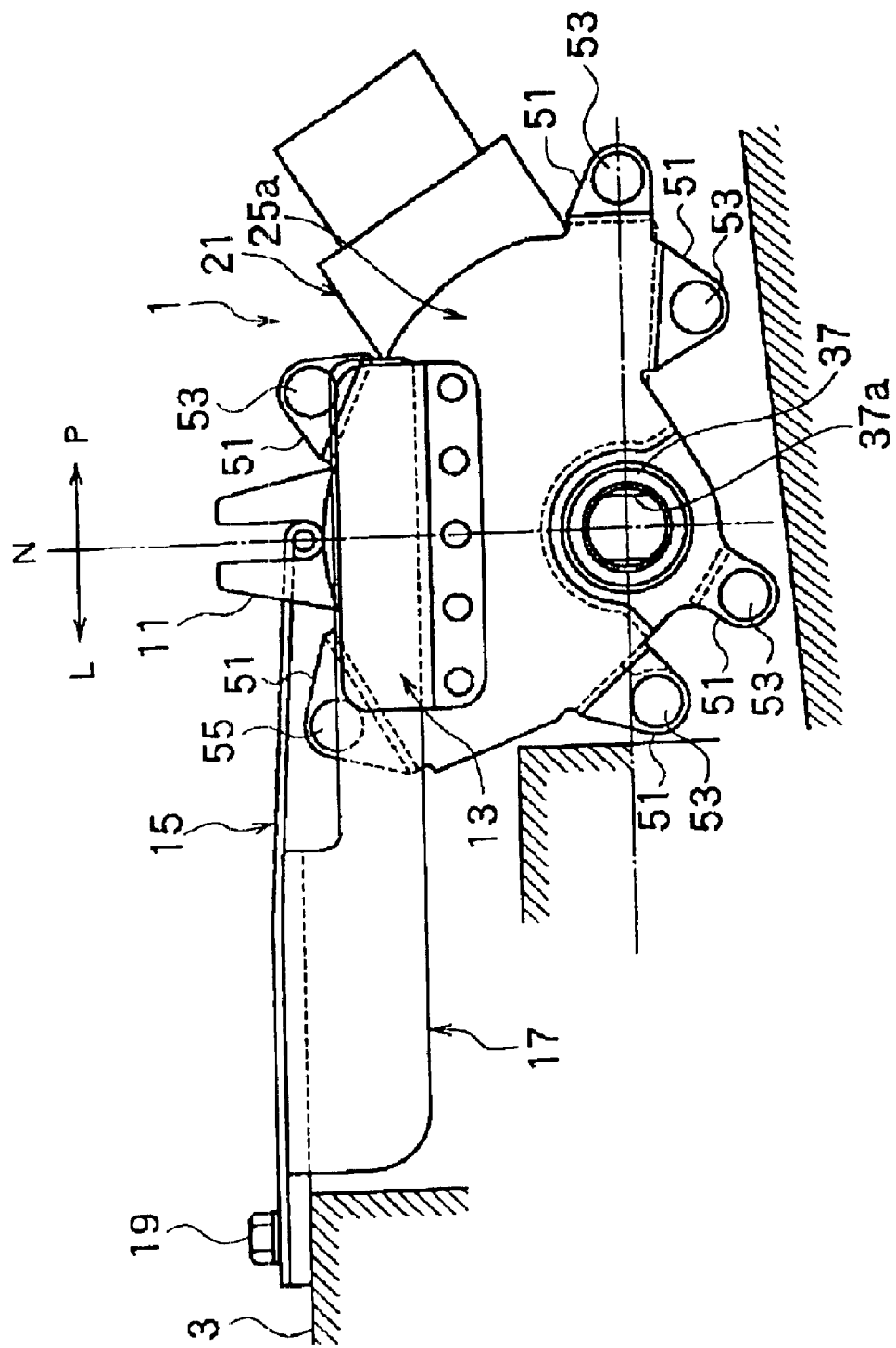
FIG. 1 is a front view of the inhibitor switch of the embodiment of the present invention, which is mounted inside the mission case of an automatic transmission.
Figure 2:
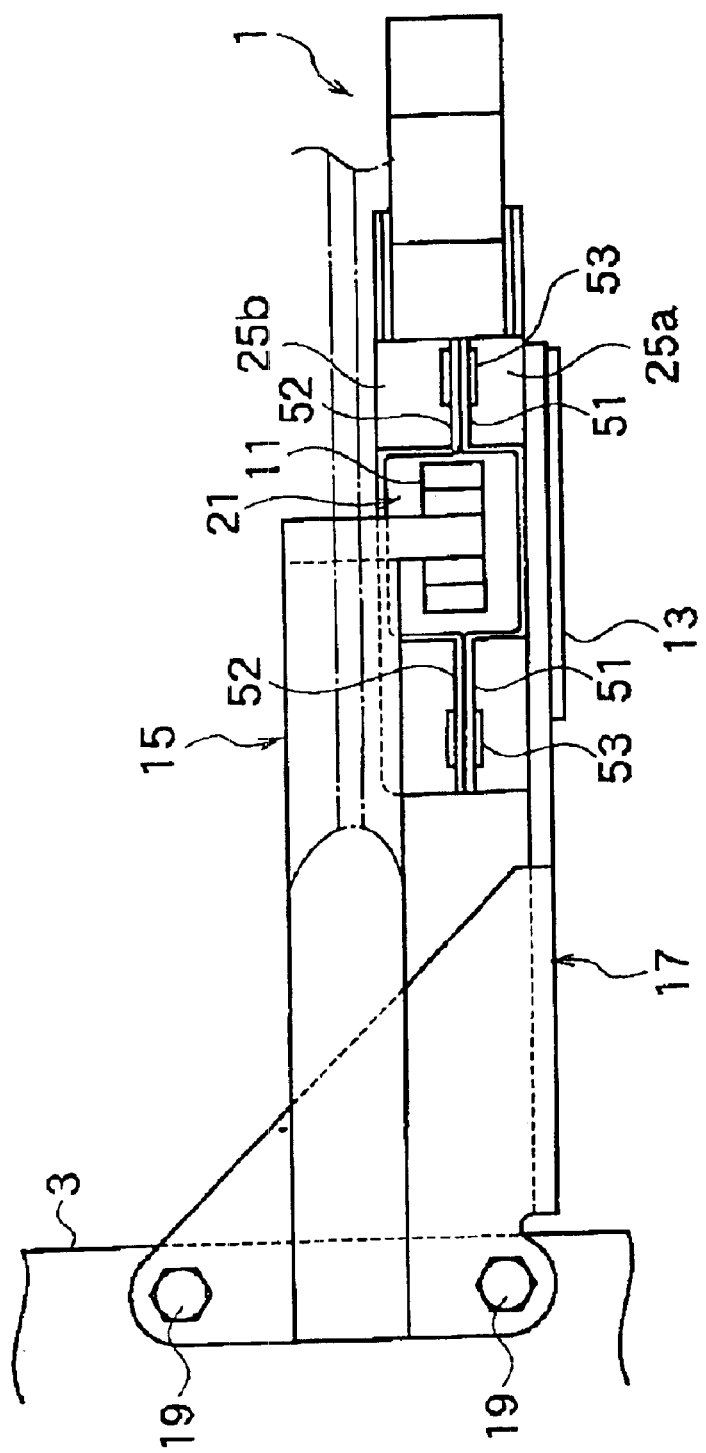
FIG. 2 is a plan view of the inhibitor switch mounted inside the mission case of an automatic transmission, this view relating to the embodiment.
Figure 3:
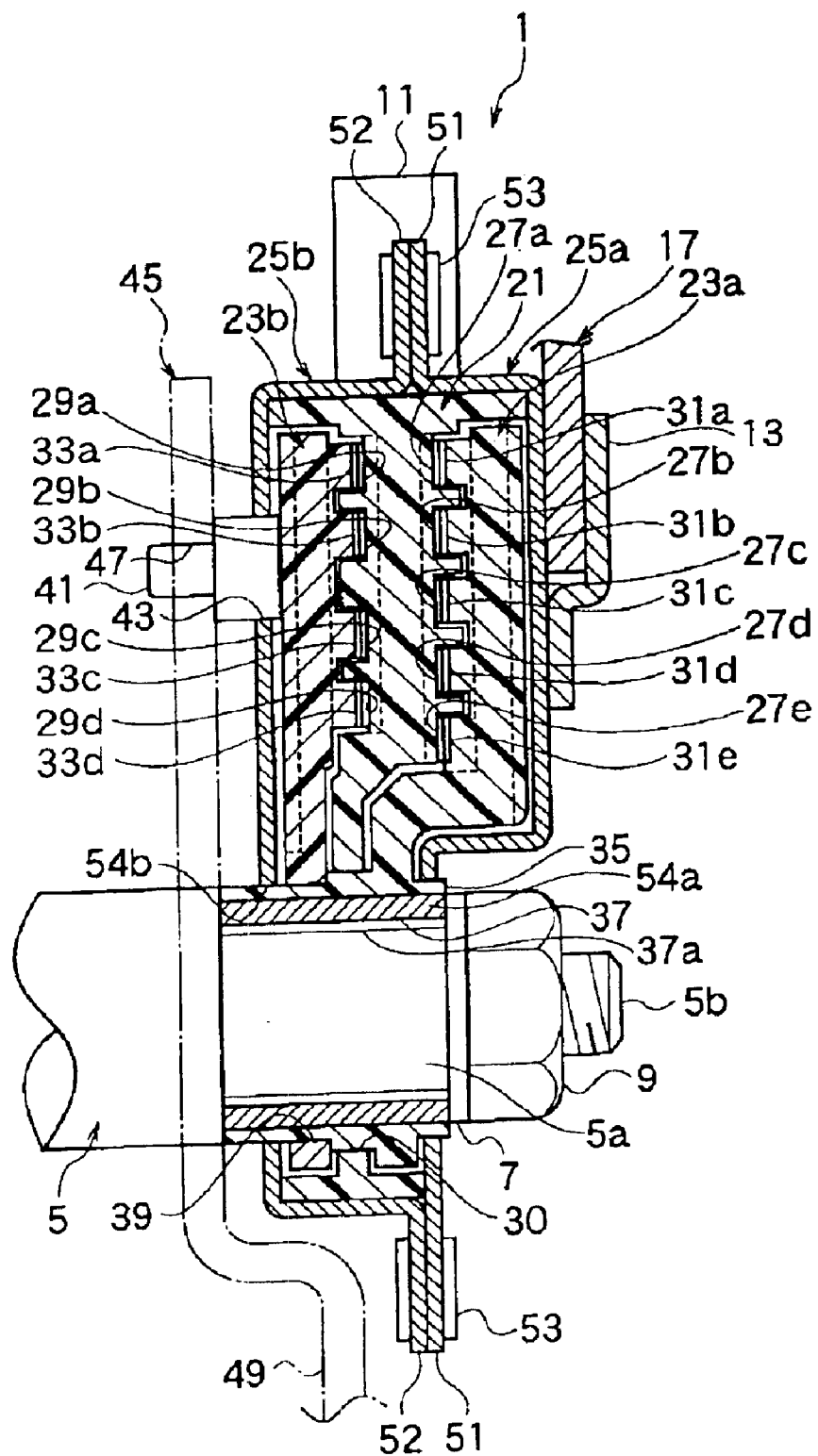
FIG. 3 is a cross-sectional view of the inhibitor switch mounted on the manual shaft; this view relating to the embodiment.

FIGS. 1 through 3 show an inhibitor switch as a rotational sliding switch in accordance with the present invention. FIG. 1 is a front view of the switch mounted inside a mission case of an automatic transmission. FIG. 2 is a plan view thereof. FIG. 3 is a cross-sectional view thereof. In FIGS. 1 and 2, the manual shaft is omitted.

As shown in FIGS. 1 through 3, an inhibitor switch 1 is joined to a manual shaft 5 inside a mission case 3. Thus, a double-width portion 5a and a male threaded portion 5b are provided at manual shaft 5, and the inhibitor switch 1 is joined to the manual shaft 5 by tightening a nut 9 onto the male threaded portion 5b via a washer 7.

A mating part 11 and a support plate 13 are mounted on the inhibitor switch 1. A rotation locking member 15 is mated with the mating part 11, and a positioning bracket 17 is mated with the support plate 13. The support plate 13 and positioning bracket 17 are joined integrally and fixed by tightening to the mission case 3 with a bolt 19.

Therefore, mating the rotation locking member 15 with the mating part 11 positions the inhibitor switch 1 in the rotation direction of the manual shaft 5, and mating the positioning bracket 17 with the support plate 13 positions the inhibitor switch 1 in the axial direction of the manual shaft 5.

Figure 4:
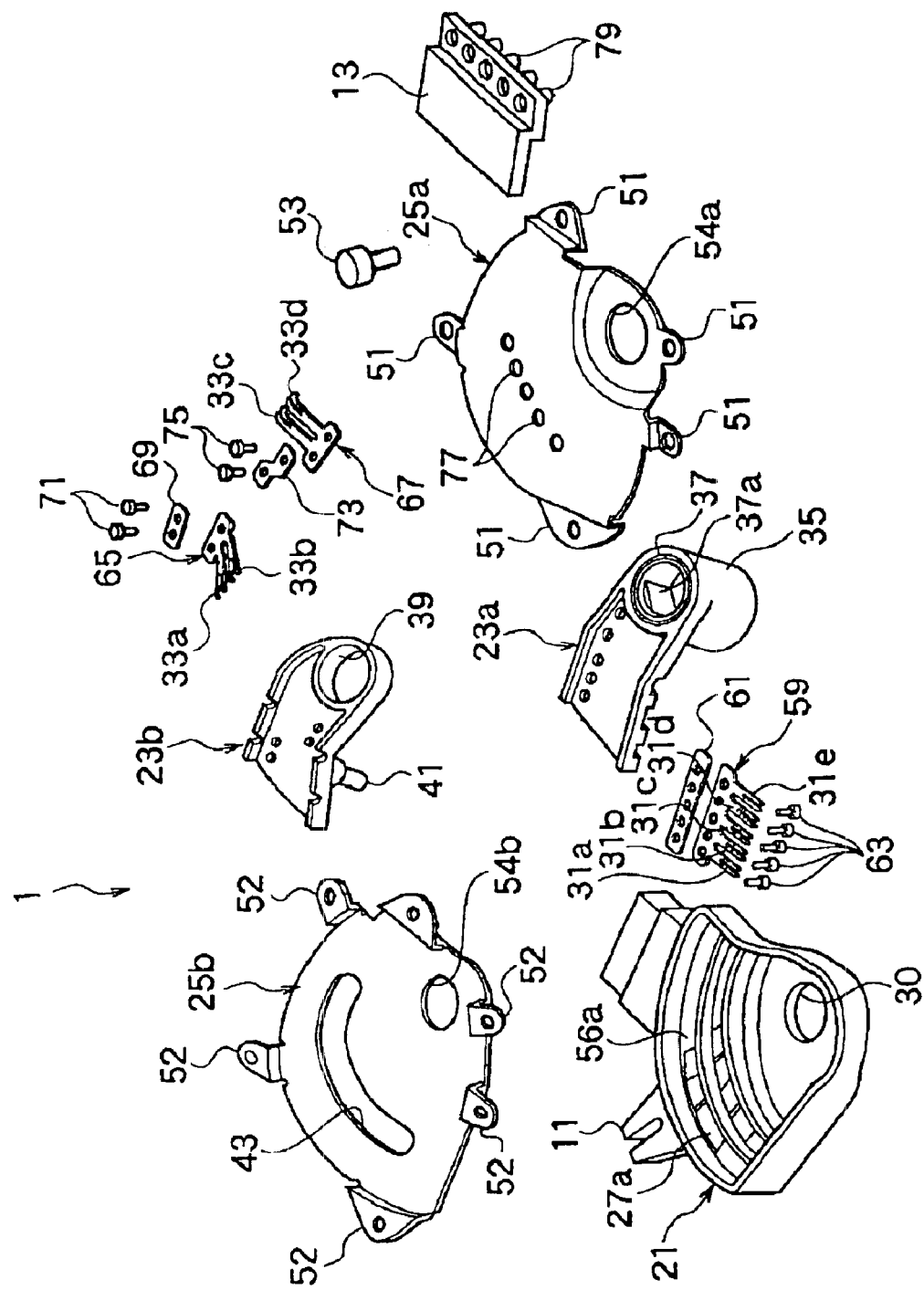
FIG. 4 is an exploded perspective view illustrating schematically the inhibitor switch, this view relating to the embodiment.

Specific structure of the inhibitor switch 1 will be further described below with reference to FIG. 4. FIG. 4 is an exploded perspective view of the inhibitor switch 1. As shown in FIGS. 1 through 4, the inhibitor switch 1 is generally composed of a pole base 21, a pair of movable bases 23a, 23b, and covers 25a, 25b.

The pole base 21 is formed from an electrically insulating resin and comprises a mating part 11 provided integrally therewith. Therefore, the pole base 21 constitutes the fixed side. The pole base is provided with fixed contacts 27a, 27b, 27c, 27d, 27e on one side surface thereof and with fixed contacts 29a, 29b, 29c, 29d on the other side surface thereof. Therefore, the pole base 21 has a configuration in which the fixed contacts 27a–27e, 29a–29d are provided on both side surfaces thereof. The pole base 21 is provided with a mating hole 30 concentric with the manual shaft 5.

A pair of movable bases 23a, 23b are formed from an electrically insulating resin and arranged on respective side surfaces of the pole base 21. Movable contacts 31a, 31b, 31c, 31d, 31e capable of sliding under the prescribed pressure against fixed contacts 27a–27e are provided on one movable base 23a. Movable contacts 33a, 33b, 33c, 33d capable of sliding under the prescribed pressure against fixed contacts 29a–29d are provided on the other movable base 23b.

One movable base 23a is joined to the manual shaft 5 of the automatic transmission, and the other movable base 23b is mated with a detent plate 45 which is a plate rotating together with the manual shaft 5.

Thus, a boss 35 concentric with the manual shaft 5 is provided on one movable base 23a integrally therewith, and a metal collar 27 is integrally joined to the boss 35 by insert molding. In portions of boss 35 and collar 37, a joining hole 37a having a double width of the collar 37 is fit onto the double-width part 5a of the manual shaft 5, mated in the rotation direction and mounted by tightening the nut 9. In this state, the boss 35 of the movable base 23a is mated with the mating hole 30 of the pole base 21 and they can rotate relative to each other.

A mating hole 39 concentric with the manual shaft 5 is provided in the other movable base 23b and mated with the boss 35 of the movable base 23a. A rotary bearing pin 41 is provided in a protruding condition at the movable base 23b integrally therewith. The rotary bearing pin 41 protrudes to the outside of the cover 25b from an elongated hole 43 provided in the cover 25b.

The detent plate 45 serving as a plate is integrally joined to the manual shaft 5, and the rotary bearing pin 41 of the movable base 23b fits snugly and with good accuracy into a drive orifice 47 of the detent plate 45. The detent plate 45 has a structure allowing each rotation position of the manual shaft 5 to be determined with respect to the mission case 3 which is a fixed component. Furthermore, a connection part 49 is provided in a protruding condition at the detent plate 45 and linked via the prescribed linking member to the shift lever side.

A plurality of projections 51, 52 are provided at the covers 25a, 25b on the outer peripheral side thereof. The projections 51, 52 match each other and are secured to each other by tightening with a rivet 53. Therefore, a structure is obtained in which the above-described pole base 21 and the movable bases 23a, 23b are arranged inside the covers 25a, 25b. Through holes 54a, 54b are provided in the covers 25a, 25b and fit rotatably on the outer peripheral surface of the boss 35 of the movable base 23a. Mounting the support plate 13 on the cover 25a is carried out by caulking. Thus, a plurality of holes 77 are provided in the cover 25a, a plurality of protrusions 79 provided in the support plate 13 are fit into holes 77 and caulked, and the support plate 13 is thus mounted on the cover 25a.

Figure 6:
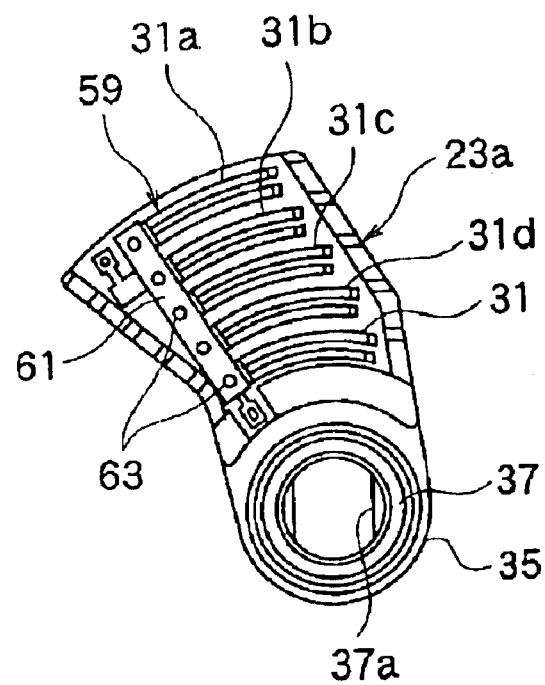
FIG. 6 is a plan view of one movable base, this view relating to the embodiment.
Figure 7:
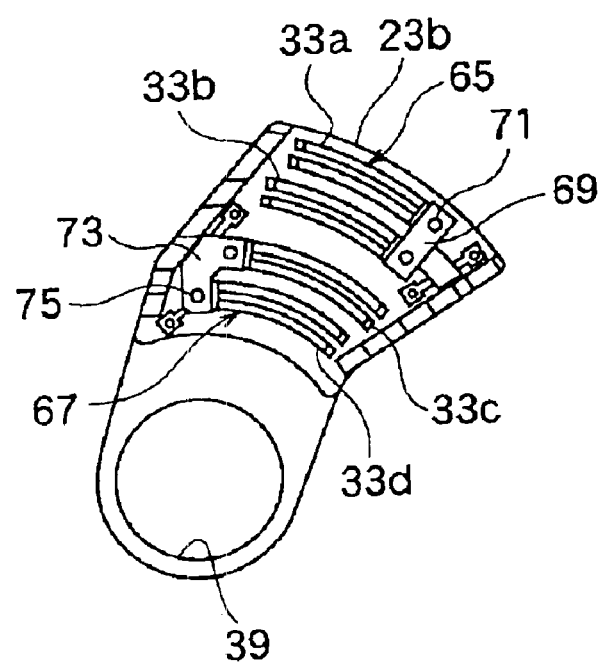
FIG. 7 is a plan view of the other movable base, this view relating to the embodiment.
Figure 8:
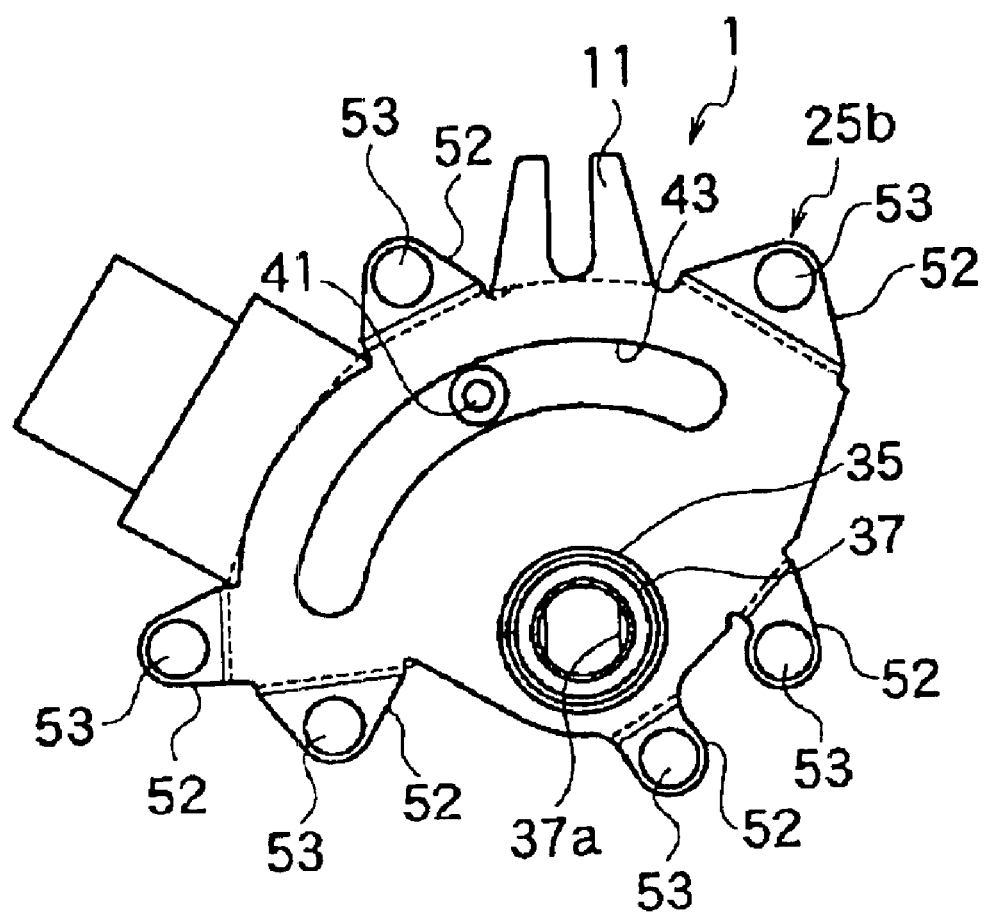
FIG. 8 is a rear view of the inhibitor switch, as viewed from the rotary bearing pin side, this view relating to the embodiment.
Figure 9:
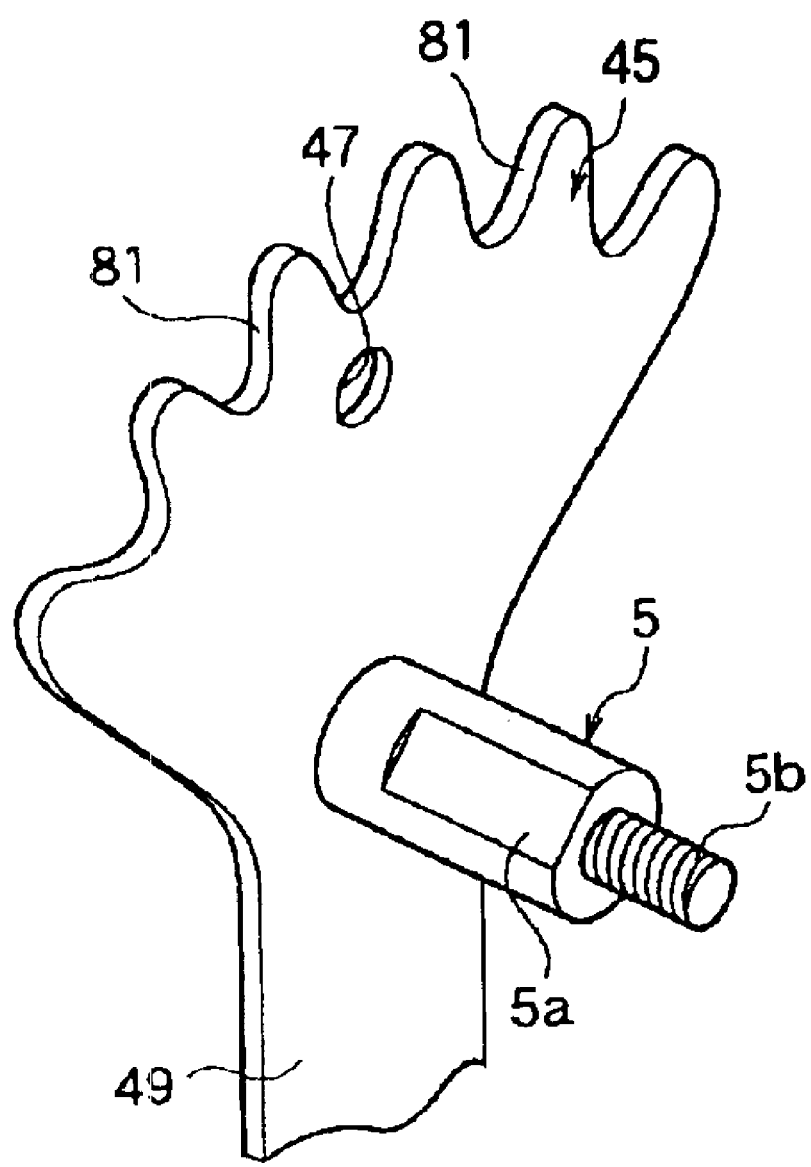
FIG. 9 is a perspective view illustrating the relationship between the inhibitor switch and the detent plate, this view relating to the embodiment.
Figure 10:
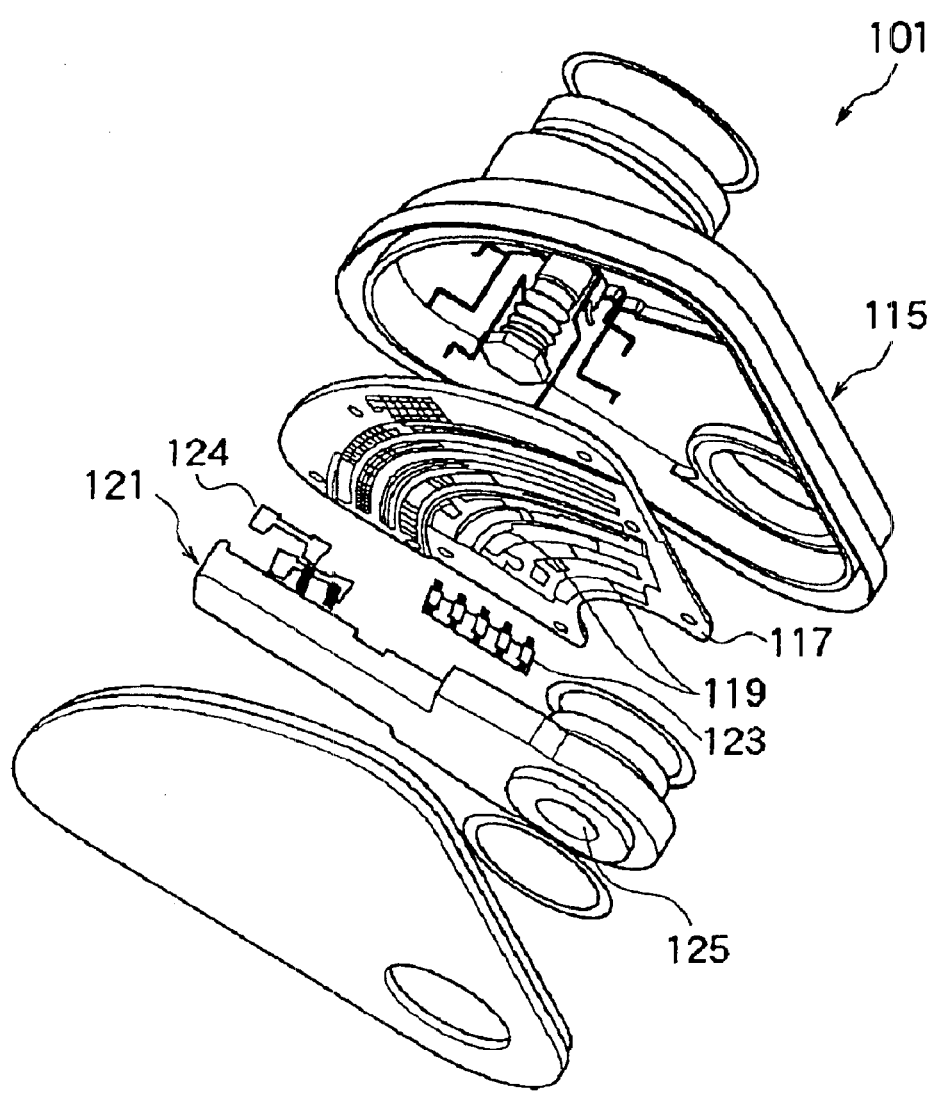
FIG. 10 is an exploded perspective view of the inhibitor switch of the conventional example.

Inhibitor switch 1 will be further explained with reference to FIGS. 5 through 9. FIG. 5 shows the pole base, (a) is a cross sectional view, (b) is a plan view, and (c) is a rear view thereof. FIG. 6 is a plan view of one movable base 23a, as viewed from the movable contact side thereof. FIG. 7 is a plan view of the other movable base 23b, as viewed from the movable contact side thereof. FIG. 8 is a rear view of inhibitor switch 1, as viewed from rotary bearing pin 41 side. FIG. 9 is a perspective view illustrating the relationship between the manual shaft and the detent plate.

As shown in FIG. 5, sliding grooves 56a, 56b, 56c, 56d, 56e, 57a, 57b, 57c, 57d are provided on respective side surfaces of pole base 21. Fixed contacts 27a–27e are arranged inside the respective sliding grooves 56a–56e. Fixed contacts 29a–29d are arranged inside the respective sliding grooves 57a–57d.

As shown in FIG. 4 and FIG. 6, the movable contacts 31a–31e of one movable base 23a are formed as a single movable contact plate 59, the base portion of the plate being pressed down by press plate 61 and secured to the movable base 23a by tightening with the rivets 63.

As shown in FIG. 4 and FIG. 7, the movable contacts 33a, 33b and movable contacts 33c, 33d of the other movable base 23b are formed as respective movable contact plates 65, 67, and the contacts of those two groups are arranged in mutually opposite directions. The base portion of the movable contact plate 65 is pressed down by the press plate 69 and secured to the movable base 23b by tightening with the rivets 71. The base portion of the movable contact plate 67 is pressed down by the press plate 73 and secured to the movable base 23b by tightening with rivets 75.

As shown in FIG. 4 and FIG. 8, the elongated hole 43 of other cover 25b is formed as a circular arc. The curvature center of the circular arc of the elongated hole 43 is the center of collar 37 matching the rotation center of the manual shaft 5. Therefore, the rotary bearing pin 41 can move along the elongated hole 43 about the axial center of the manual shaft 5.

As shown in FIG. 9, the detent plate 45 is mounted integrally on the manual shaft 5 and can rotate integrally therewith about the axial center of the manual shaft 5. A plurality of recesses 81 corresponding to the shift positions of the automatic transmission are formed in the detent plate 45, and, for example, detent pins supported on the mission case 3 side are elastically engaged with the recesses. Therefore, if the manual shaft 5 and the detent plate 45 are rotated by the shift operation, elastic contact position of the detent pins with respect to recesses 81 is changed, the rotation position of the manual shaft 5 is determined by this position, and the shift position of the automatic transmission can be determined.

Further, if a driver conducts a shift operation by operating the shift lever, the connection part 49 of the detent plate 45 receives a drive force in response to this operation, the detent plate 45 and the manual shaft 5 rotate together integrally, the manual valve is operated, and the automatic transmission can be shifted.

Due to the rotation of the manual shaft 5, a rotation force is transmitted from the double-width part 5a of the manual shaft 5 to the joining hole 37a of collar 37 and a rotation force is transmitted to the movable base 23a via the collar 37. Under the effect of this rotation force, the movable base 23a moves rotationally around the axial center of the manual shaft 5 and the movable contacts 31a–31e slide under the prescribed contact pressure against the fixed contacts 27a–27e.

With respect to the detent plate 45 which rotates integrally with the manual shaft 5, the rotary bearing pin 41 receives a rotation drive force from the drive orifice 47, and the rotary bearing pin 41 moves along the elongated hole 43 of the cover 25b. As a result of this movement, the movable base 23b moves rotationally about the axial center of the manual shaft 5, and the movable contacts 33a–33d slide under the prescribed contact pressure against the fixed contacts 29a–29d.

If the operation of the shift lever is completed and the rotation of the manual shaft 5 and the detent plate 45 is terminated, the rotation position of manual shaft 5 can be detected by the corresponding sliding positions of the sliding contacts 31a–31e, 33a–33d with respect to the fixed contacts 27a–27e, 29a–29d. As a result, the shift position of the automatic transmission is detected.

Further, because the fixed contacts 27a–27e, 29a–29d are provided on respective side surfaces of the pole base 21, as described hereinabove, and the movable bases 23a, 23b are arranged on both side surfaces of the pole base 21, the increase in size of the entire inhibitor switch 1 can be controlled even when the number of the fixed contacts 27a–27e, 29a–29d is increased.

Because the fixed contacts 27a–27e and fixed contacts 29a–29d can be formed simultaneously by insert molding on the integrated pole base 21, the contacts can be manufactured at a cost lower than in the case in which the respective fixed contacts are insert molded on the pole base split in two, as in the conventional example illustrated by FIG. 11.

Because fixed contacts the 27a–27e and fixed contacts 29a–29d are secured by insert molding to the integrated pole base 21, the manufacturing error is reduced and the dimensional accuracy can be increased by comparison with the conventional processing in which the respective fixed contacts are provided on the split pole base and the sections of the pole base are then joined integrally, for example, by ultrasonic welding. Moreover, accurate detection can be conducted by ON/OFF switching caused by the movable contacts 31a–31w, 33a–33e sliding against the fixed contacts 27a–27e, 29a–29d.

If a configuration is employed in which the mating hole 39 of the movable base 23b is fixedly mounted by rear fitting on the outer periphery of the boss 35 of the movable base 23a and the rotation force of the manual shaft 5 is also transmitted to the movable base 23b via the collar 37 and boss 35, rather then the configuration in which the movable base 23b is driven rotationally by the detent plate 45 under the effect of the rotary bearing pin 41, there is a risk that the positional accuracy of the movable base 23a will drop due to the backlash between the boss 35 and the mating hole 39 and that accurate detection will be impossible. However, driving rotationally the movable base 23b with the detent plate 45 of a separate system, as in the present embodiment, makes it possible to prevent the above-mentioned backlash and to conduct accurate detection.

Further, the movable base 23 can be driven not only with the detent plate, but also by integrally joining a special plate other than the detent plate to the manual shaft 5 and driving with this plate.

It is also possible to employ a configuration in which the length of the boss 35 and the collar 37 of one movable base 23a in the axial direction is reduced by almost half, the other movable base 23b is provided with similar boss and collar, and the other movable base 25b is joined, similarly to the movable base 25a, to the double-width part 5a of the manual shaft 5.

Further, in the above-described embodiment, the rotational sliding switch was employed in an inhibitor switch, but it can be also employed in other switches.

| | |
|---|---|
| 1 | INHIBITOR SWITCH (ROTATIONAL SLIDING SWITCH) |
| 21 | POLE BASE |
| 23a, 23b | MOVABLE BASES |
| 27a, 27b, 27c, 27d, 27e, 29a, 29b, 29c, 29d | FIXED CONTACTS |
| 31a, 31b, 31c, 31d, 31e, 33a, 33b, 33c, 33d | MOVABLE CONTACTS |
| 45 | DETENT PLATE (PLATE) |

What is claimed is:

1. A rotational sliding switch comprising:

a pole base on a fixed side supporting fixed contacts;

movable bases that support movable contacts and can move rotationally so as to cause the movable contacts to slide under a prescribed contact pressure against said fixed contacts;

a rotation position of a side to be detected being detected by a sliding position of the movable contacts with respect to said fixed contacts, wherein said fixed contacts are provided on each of two side surfaces of said pole base; and the movable bases are arranged singly on each of the two side surfaces of the pole base, wherein one of said movable bases is joined to a manual shaft of an automatic transmission, and the other movable base is mated with a plate rotating together with said manual shaft.

2. A rotational sliding switch according to claim 1, wherein said plate is a detent plate for determining each rotation position of said manual shaft with respect to the fixed side.

* * * * *